UNITED STATES PATENT OFFICE.

BERNHARD JACQUES FLURSCHEIM, OF NEW YORK, N. Y.

PROCESS OF MANUFACTURING DIPHENYLAMIN.

1,212,928.     Specification of Letters Patent.     Patented Jan. 16, 1917.

No Drawing.     Application filed June 24, 1916. Serial No. 105,588.

*To all whom it may concern:*

Be it known that I, BERNHARD JACQUES FLURSCHEIM, a subject of the King of Great Britain, residing at New York city, county of New York, and State of New York, have invented a new and useful Improvement in Processes of Manufacturing Diphenylamin, of which the following is a full, clear, and exact description.

It is customary to manufacture diphenylamin by the action of anilin on anilin hydrochlorid. This reaction has to be carried out in an autoclave, the iron of which has to be protected against the action of hydrochloric acid by a suitable coating—usually enamel.

I have discovered that it is possible to manufacture diphenylamin from anilin, without the use of a protective coating for the iron, by substituting ferric chlorid for the hydrochloric acid of the anilin hydrochlorid. This method has the further advantage that it is not necessary to manufacture anilin hydrochlorid first, it being sufficient to use a mixture of anilin with ferric chlorid. I have also discovered that the duration of the reaction can be shortened and the yield increased by adding a suitable catalyst (such as finely divided copper (*e. g.*, copper bronze) or iodin) or more than one suitable catalyst (*e. g.*, finely divided copper and iodin).

The proportions of the ingredients used and the temperature, duration and other conditions of the reaction may be varied within more or less wide limits; the following method of procedure is given merely as an indication of one way in which the reaction may be carried out and I wish to emphasize that I do not intend, in detailing this one method, to limit myself to the particular proportions or detailed conditions given in this example, and that I do not intend to imply that other proportions and conditions than those herein given may not be found, in actual commercial practice, to be preferable.

An autoclave charge is made up of ferric chlorid ($FeCl_3.6H_2O$) 430 parts, anilin 892 parts, finely divided copper 44.5 parts, iodin 4.5 parts. The charge is then gradually heated to 238° C. Owing to the water present in the ferric chlorid, pressure is soon built up on heating, and this pressure is released whenever a pressure of 110 lbs. is reached, the temperature being lowered to 180° C. before releasing this pressure, in order to avoid undue loss of anilin. Autoclaving is continued for about 20 hours at 238° to 240° C., and the diphenylamin produced is thereupon separated in the usual way from any unchanged anilin and other materials present.

Instead of using $FeCl_3.6H_2O$, it is also possible to use anhydrous ferric chlorid, or ferric chlorid containing a different proportion of water.

What I claim is:

1. The process of manufacturing diphenylamin comprising the heating of anilin in the presence of ferric chlorid.

2. The process of manufacturing diphenylamin comprising the heating of anilin in the presence of ferric chlorid and a catalyst.

3. The process of manufacturing diphenylamin comprising the heating of anilin in the presence of ferric chlorid and finely divided copper.

4. The process of manufacturing diphenylamin comprising the heating of anilin in the presence of ferric chlorid, finely divided copper and iodin.

In testimony of which invention, I have hereunto set my hand, at New York city, N. Y., on this 23rd day of June, 1916.

BERNHARD JACQUES FLURSCHEIM.